United States Patent [19]

Kosonocky

[11] 3,720,922

[45] March 13, 1973

[54] CHARGE COUPLED MEMORY

[75] Inventor: Walter Frank Kosonocky, Skillman, N.J.

[73] Assignee: RCA Corporation, Princeton, N.J.

[22] Filed: March 17, 1971

[21] Appl. No.: 125,303

[52] U.S. Cl. ..............340/173 R, 307/279, 307/304, 317/235 G, 340/173 CA

[51] Int. Cl. .........G11c 11/34, G11c 5/04, H01l 3/00

[58] Field of Search ....340/173 CA, 173 R; 307/279, 307/304; 317/235 G

[56] References Cited

UNITED STATES PATENTS 3,387,286 6/1968 Dennard ........................340/173 CA

*Primary Examiner*—Bernard Konick

*Assistant Examiner*—Stuart Hecker

*Attorney*—H. Christoffersen

[57] ABSTRACT

A plurality of storage electrodes, extending in the column direction, each electrode coupled to a common semiconductor substrate at spaced regions along its length, each such region comprising a minority carrier storage location. A plurality of digit lines are formed in the substrate, each such line being coupled to a column of locations. These lines serve as sources of minority carriers and as sense lines. A plurality of word lines extending in the row direction are located one over each row of locations. Each word line can be operated to create conduction channels between the digit lines and the storage locations, respectively, along that word line.

4 Claims, 5 Drawing Figures

INVENTOR.
WALTER F. KOSONOCKY
BY
ATTORNEY

INVENTOR.
WALTER F. KOSONOCKY
BY
Samuel Cole
ATTORNEY

CHARGE COUPLED MEMORY

BACKGROUND OF THE INVENTION

Copending U.S. Pat. application "Charge Coupled Memory System," Ser. No. 106,357, filed Jan. 14, 1971 by Joseph R. Burns and assigned to the same assignee as the present application describes a charge coupled memory system. The present application deals with an improved charge coupled memory system of simpler structure then the one described in the Burns application and which is capable of higher bit packing density.

SUMMARY OF THE INVENTION

A semiconductor substrate and a plurality of storage electrodes each extending in the column direction and each coupled to the substrate at spaced regions along its length. A plurality of digit lines extending also in the column direction each digit line capable of acting as a source of minority charge carriers for a column of storage locations. A plurality of word lines extending in the row direction each such line being coupled to a row of storage electrodes and each such line for controlling the flow of minority charge carriers between the respective digit lines and their storage locations along that word line.

DETAILED DESCRIPTION

The memory shown in FIGS. 1–4 includes a substrate 10 formed of a semiconductor material such as N-type silicon. A plurality of conductive digit lines of P+ conductivity type, three of which are shown at $D_1$, $D_2$ and $D_3$, respectively, are formed in the substrate, for example by diffusing a substantial amount of P-type material such as boron into the substrate. The substrate and digit lines are covered by an insulating layer 12 such as one formed of silicon dioxide ($SiO_2$).

Figure 4:
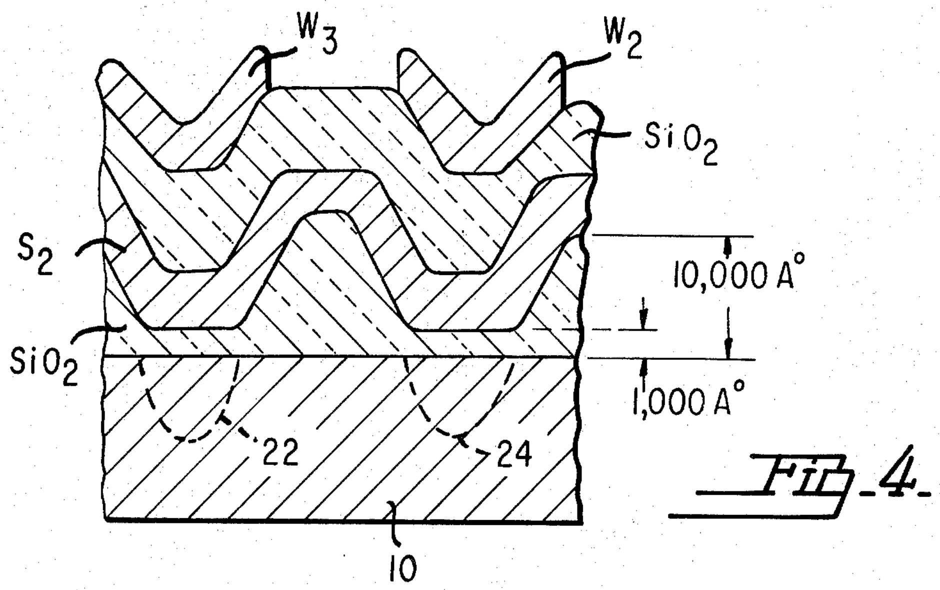

A plurality of polysilicon storage electrodes extend in the same direction as the digit lines, three such electrodes being shown at $S_1$, $S_2$ and $S_3$ respectively. Each silicon electrode takes a meandering path relative to the substrate as illustrated in FIG. 4. In each portion of the storage electrode S which is beneath an aluminum word line W, which word lines will be discussed shortly, the silicon electrode is spaced very close to the substrate. A typical dimension, by way of example, may be 1,000 Angstroms. In the region of each storage electrode between two adjacent word lines, the storage electrode is spaced a substantial distance from the substrate, 10,000 A being a typical dimension. As will be discussed in more detail shortly, a minority charge carrier can be stored at each region of the storage electrode spaced close to the substrate, each such region corresponding to a memory location. All of the storage electrodes may be connected to a direct-voltage source such as one at −10 volts.

The final portion of the memory structure comprises a plurality of aluminum word lines, four of which are shown at $W_1$, $W_2$, $W_3$ and $W_4$ respectively. These word lines are insulated from the storage electrodes by silicon dioxide. The word lines extend in the row direction and, as already implied, each "intersection" of a word line with a storage electrode comprises a memory location. For the major portion of its extent, each word line is spaced a substantial distance such as 10,000 A to 12,000 A from the substrate 10. However, in the region between a digit line such as $D_1$ and a storage electrode such as $S_1$ (e.g. FIG. 2) the word line is spaced relatively close to the substrate, 1,000 A being a typical dimension. Moreover, as is shown most clearly in FIG. 3, the center portion 20 of the word line in the region between a digit line and the source electrode is spaced relatively closer to the substrate than the outer edges of the word line. The reason is to confine the conductive channel 30', which is formed beneath this portion of the word line under certain operating conditions, to a region within the outer edges of the word line.

In the operation of the memory of FIGS. 1–4, the negative bias voltage of −10 volts applied to the storage electrodes $S_1$ . . . $S_3$ creates a potential well beneath each region of each storage electrode which is coupled to (is spaced close to) the substrate. In FIG. 4, two such wells are shown at 22 and 24 respectively. The word lines W normally are at a relatively positive voltage level such as at ground potential and the digit lines are normally at a relatively negative voltage level such as −20 volts.

A "1" may be written into a memory location by applying a negative pulse, such as a pulse of −15 volts, to the word line passing through that location while concurrently applying a relatively positive pulse, such as one at ground potential, to the digit line coupled to that location. A "0" may be written into a memory location by maintaining the digit line coupled to that location at a relatively negative voltage, such as one at −20 volts, while applying a negative voltage pulse, such as one at −15 volts, to the word line.

Figures 1, 2, 3:
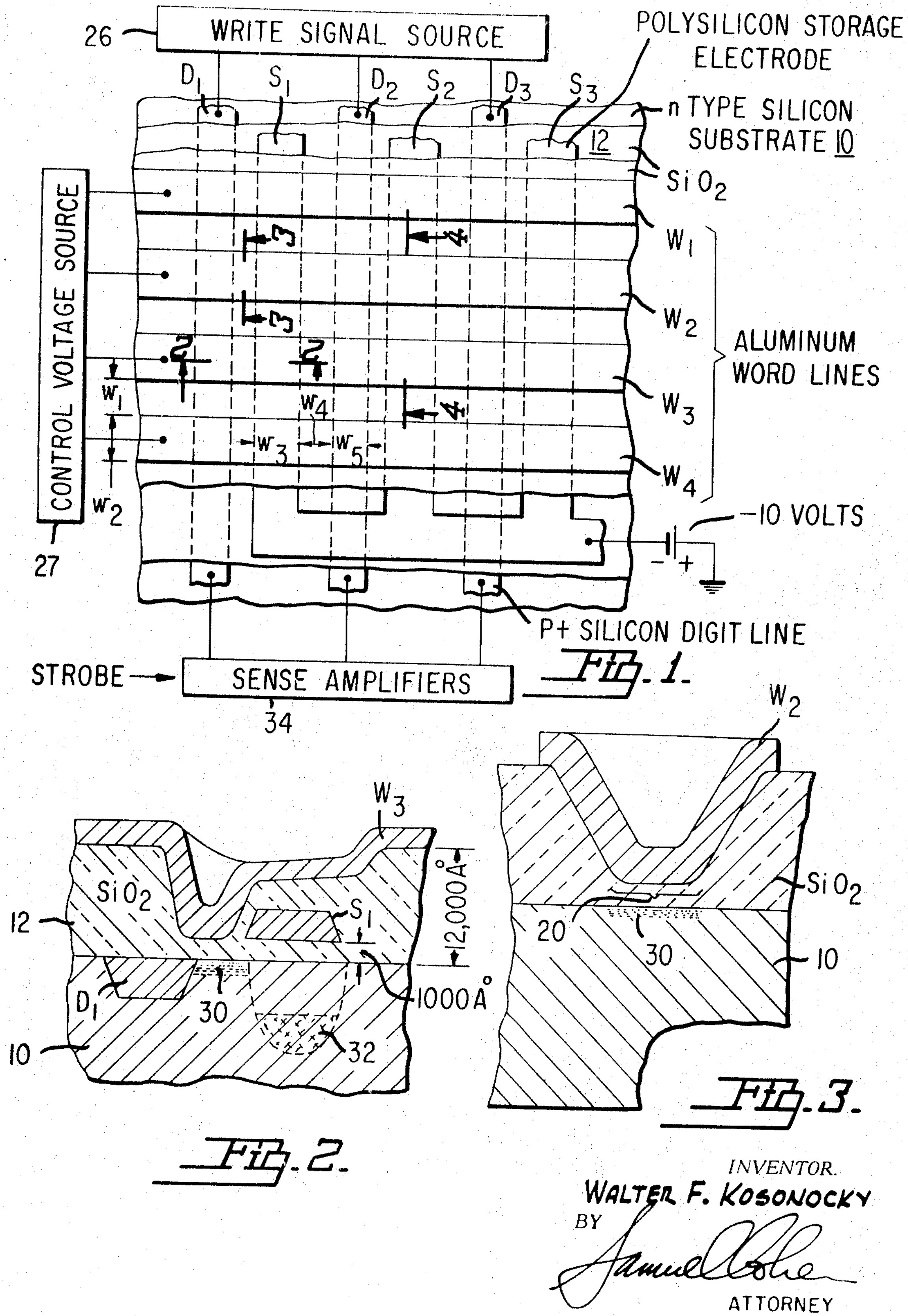
FIG. 1 is a plan view of a preferred embodiment of the invention.
FIGS. 2, 3 and 4 are sections along lines 2—2, 3—3 and 4—4 respectively of FIG. 1.
Figure 5:
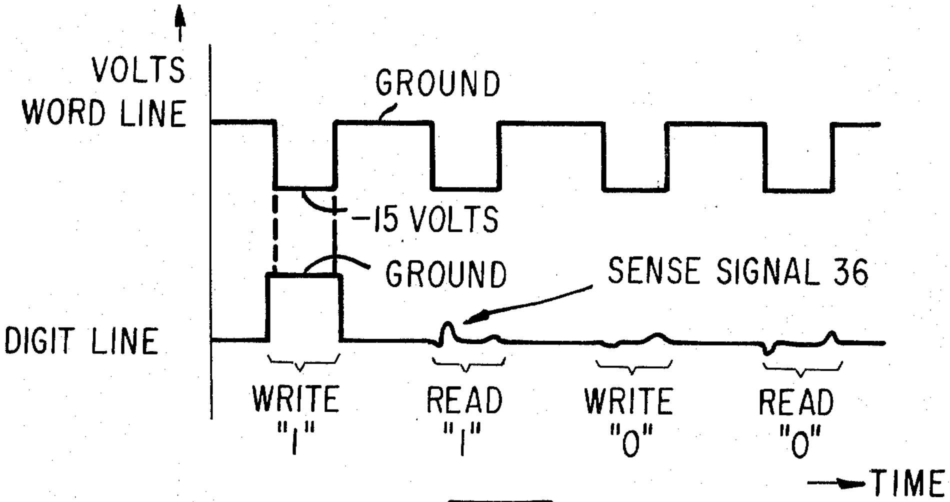
FIG. 5 is a drawing of waveforms present in the system of FIG. 1.

The above may be illustrated with the aid of FIGS. 1, 2 and 5. As mentioned above, to write a "1," a digit line such as $D_1$ is made relatively positive — is driven to a voltage such as ground. This makes it possible for the minority carriers — holes in the case of the N-type silicon substrate 10 illustrated, subsequently to flow from the digit line $D_1$. The digit line $D_1$, in other words is placed in conduction to act as a "source" of charges. Shortly after the start of the positive-going write pulse, the word line such as $W_3$ (FIG. 2) is driven negative to say −15 volts. The result is the creation of a conduction channel illustrated schematically at 30 in FIG. 2. The minority charge carriers present in the digit line $D_1$ now flow through the conduction channel and into the potential well, as indicated schematically at 32 in FIG. 2. When the digit and word line voltages are removed, the charge at 32 remains stored at the location shown for a matter of seconds.

To write a "0" into a memory location, the digit line such as $D_1$, is maintained at a voltage such as −20 volts during the time the somewhat more positive voltage (−15 volts) is applied to the word line. Under this set of conditions, no minority charge carriers are available to flow from the digit line through the conduction channel 30 to the potential well beneath the storage electrode $S_1$. As a matter of fact, a flow of charge in the reverse direction will occur if the potential well 32 happens to be storing a charge at the time. Storage of a "0," in other words, is manifested as the absence of a minority carrier charge beneath a storage location.

While the write operation has been described for a single storage location, the memory of the invention is preferably operated in word organized fashion — (writing and reading a word at a time). Here, the write signal source applies signals to all of the digit lines, each signal being indicative of the bit of the word it is desired to write, ground potential in the case of a "1" and a relatively negative voltage such as −20 volts in the case of a "0." Concurrently, the control voltage source 27 applies to one of the word lines a negative voltage pulse, such as one at −15 volts, and maintains all of the remaining word lines at ground potential.

The read operation is achieved in the manner illustrated in FIG. 5. As in the case of write, a word at a time may be read out of the memory. A negative voltage pulse is applied to the desired one of the word lines and the sense amplifiers 34 are employed to sense for the presence or absence of a signal. If a memory location along the word line is storing a "1," then in response to the leading edge of the negative pulse applied to the word line, charge will flow from that storage location to the digit line of that memory location. Referring to FIG. 2, charge stored in the potential well beneath storage electrode $S_1$ will flow through the conduction channel 30 and into the digit line $D_1$ which, during this operation, is acting as a "drain" electrode. The sense amplifier connected to the digit line may be strobed at the time this sense signal is present to produce an output signal. A typical sense signal is shown at 36 in FIG. 5.

If during a read interval a memory location is storing a "0," no charge will transfer from that location to the digit line of that location. The sense amplifier connected to that line therefore will produce essentially no sense signal. This situation also is illustrated in FIG. 5 at "READ '0'."

As mentioned above, the storage time of the memory cells of the present invention is a matter of seconds. After a period such as this, there is sufficient thermal generation of minority carriers to affect the stored information. The storage time of the memory can be increased by employing memory "refresh" techniques for periodically reading out from each location the information stored therein and then reinserting it into that location.

A more detailed discussion of the operation of charge coupled devices may be found in copending application titled "Charge Coupled Circuits" Ser. No. 106,381, filed Jan. 14, 1971 by the present inventor and assigned to the same assignee as the present application. The copending application also discusses various methods by which charge coupled circuits may be constructed and various materials which may be used in the construction.

An important advantage of the memory of the present invention is its simple structure which permits extremely high bit packing density. Typical dimensions for the various structures may be as follows:

spacing $w_1$ between word lines = 0.1 to 0.3 mils
width $w_2$ of word line = 0.1 to 0.4 mils
width $w_3$ of digit line = 0.2 to 0.3 mils
spacing $w_4$ between digit line and storage electrode = 0.1 to 0.2 mils
width $w_5$ of storage electrode = 0.2 to 0.4 mils

What is claimed is:

1. A charge coupled memory comprising, in combination:

a semiconductor substrate;

a plurality of storage electrodes, each comprising a conductor insulated from the substrate and extending in the column direction, and each coupled to the substrate only at spaced regions along its length, each region of a storage electrode coupled to the substrate comprising a charge storage location, said locations being arranged in columns and rows;

a plurality of digit lines formed in said substrate, each capable of acting as a source of minority charge carriers, each line coupled to a column of said storage locations, each digit line comprising a region in said semiconductor substrate of a conductivity opposite to that of the substrate; and a plurality of word lines, each word line coupled to a row of storage locations, each word line being formed with spaced regions along its length coupled to the substrate for controlling the conduction of minority charge carriers between the respective digit lines and their storage locations along that word line, and each storage electrode passing beneath said word lines.

2. In a charge coupled memory as set forth in claim 1, further including:

means coupled to all of said storage electrodes for applying a direct voltage bias thereto in a sense to produce at each storage location a potential well.

3. In a charge coupled memory as set forth in claim 2, further including:

means coupled to said digit lines for switching them between voltage levels at which they operate as sources and drains, respectively, for minority charge carriers; and means coupled to said word lines for switching them between voltage levels at which they will permit and prevent, respectively, the passage of minority charge carriers between digit lines and storage locations along said word lines.

4. A charge-coupled memory comprising, in combination:

a substrate; and a plurality of storage locations arranged in columns and rows on said substrate, each storage location comprising solely the following elements;

a digit line embedded in the substrate and extending in the column direction, said line being formed of a different conductivity material than the substrate:

a storage electrode spaced from the digit line and extending also in the column direction, said electrode following a path which is relatively close to the substrate at said location and substantially further from the substrate between locations; and a word line which extends in the row direction, which is relatively close to the substrate in the region thereof between the digit line and storage electrode, which is insulated from and passes over the digit line and storage electrode, and which is spaced substantially further from the substrate in the regions thereof where it passes over the digit line and storage electrode than in the region between the two, whereby a minority carrier charge may be stored at said location by placing the digit line at a potential such that it acts as a source of minority carriers, placing said storage electrode at a potential to form a potential well in the region of the substrate to which it is closely spaced, and placing said word line at a potential to create a conduction channel between said digit line and said potential well.

* * * * *